United States Patent [19]
Sallee

[11] Patent Number: 6,128,680
[45] Date of Patent: Oct. 3, 2000

[54] APPARATUS AND METHOD OF SHARING A STATE MACHINE FOR INPUT AND OUTPUT SIGNAL PROCESSING

[75] Inventor: William A. Sallee, Allen, Tex.

[73] Assignee: Alcatel USA Sourcing, L.P., Plano, Tex.

[21] Appl. No.: 08/993,350

[22] Filed: Dec. 18, 1997

[51] Int. Cl.[7] .................................................. G06F 9/06
[52] U.S. Cl. ................................. 710/66; 710/65; 710/5
[58] Field of Search ................................. 710/5, 65, 66; 712/229; 708/204

[56] References Cited

U.S. PATENT DOCUMENTS

| | | | |
|---|---|---|---|
| 5,467,351 | 11/1995 | Baumert | 370/85.15 |
| 5,471,165 | 11/1995 | Liedberg | 327/250 |
| 5,689,535 | 11/1997 | Cantwell et al. | 375/364 |
| 5,883,894 | 3/1999 | Patel et al. | 370/438 |

*Primary Examiner*—Thomas C. Lee
*Attorney, Agent, or Firm*—Baker Botts L.L.P.

[57] ABSTRACT

One aspect of the invention is a shared signal processor comprising input circuitry to receive a plurality of input signals and output circuitry operable to transmit a plurality of output signals. Storage circuitry is operable to store state information and signal data for each of the plurality of input signals and output signals. A state machine is coupled to the input circuitry, output circuitry, and storage circuitry and is operable to poll each input signal and output signal to identify a first signal requiring processing. The state machine is further operable to load the state information and signal data associated with the first signal and process the first signal.

18 Claims, 11 Drawing Sheets

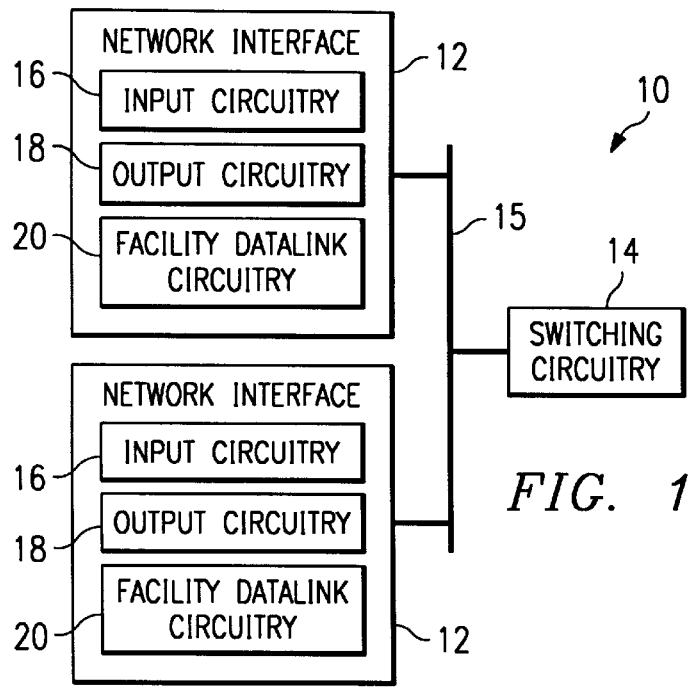
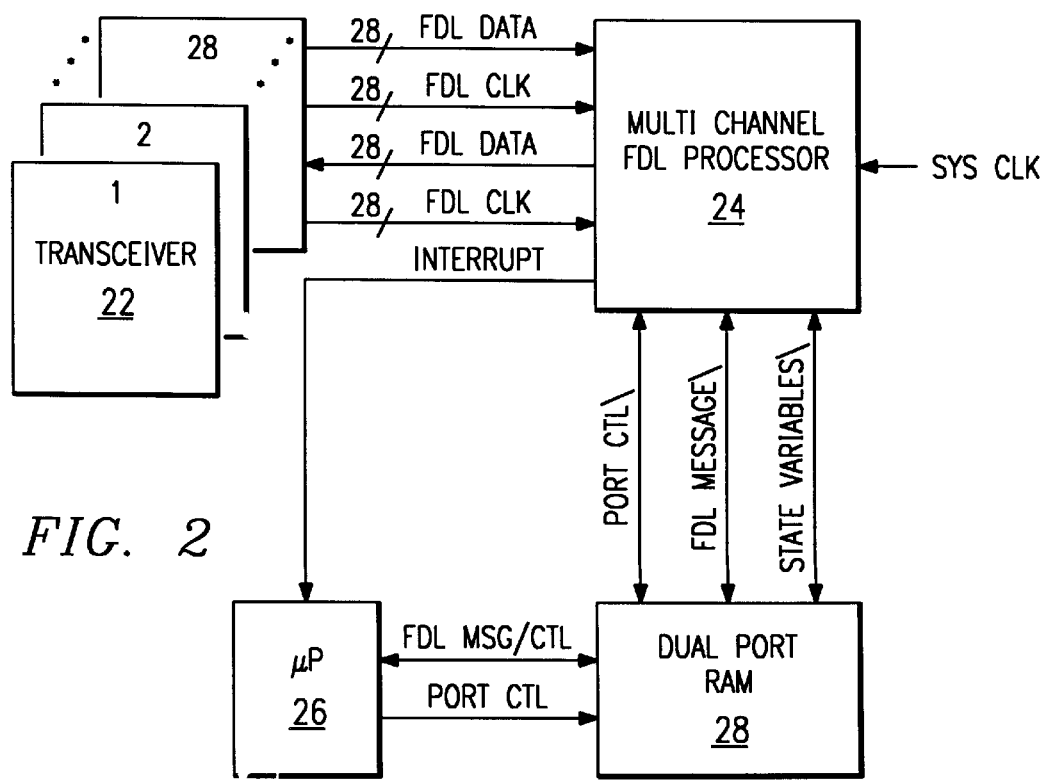
FIG. 1
FIG. 2

FIG. 9

| ADDRESS AND FUNCTION | addr | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| PAGE 0: INTERRUPTS | 0 | B1 | P1 | B2 | P2 | B3 | P3 | B4 | P4 | B5 | P5 | B6 | P6 | B7 | P7 | B8 | P8 |
|  | 1 | B9 | P9 | B10 | P10 | B11 | P11 | B12 | P12 | B13 | P13 | B14 | P14 | B15 | P15 | B16 | P16 |
|  | 2 | B17 | P17 | B18 | P18 | B19 | P19 | B20 | P20 | B21 | P21 | B22 | P22 | B23 | P23 | B24 | P24 |
|  | 3 | B25 | P25 | B26 | P26 | B27 | P27 | B28 | P28 |  |  |  |  |  |  |  |  |
| PAGE 0: TRANSMIT RDY | 4 | B1 | P1 | B2 | P2 | B3 | P3 | B4 | P4 | B5 | P5 | B6 | P6 | B7 | P7 | B8 | P8 |
|  | 5 | B9 | P9 | B10 | P10 | B11 | P11 | B12 | P12 | B13 | P13 | B14 | P14 | B15 | P15 | B16 | P16 |
|  | 6 | B17 | P17 | B18 | P18 | B19 | P19 | B20 | P20 | B21 | P21 | B22 | P22 | B23 | P23 | B24 | P24 |
|  | 7 | B25 | P25 | B26 | P26 | B27 | P27 | B28 | P28 |  |  |  |  |  |  |  |  |
| PAGES 1-28: RECEIVE STATE STORE | 0-7 | STATE VARIABLE AND CHANNEL CONTROL REGISTERS SEE FIGURE 10 ||||||||||||||||
| PAGES 1-28: RECEIVE HDLC STORE | 8 | MESSAGE BYTE 0 |||||||| MESSAGE BYTE 1 ||||||||
|  | ... |  |||||||| |||||||||
|  | ... |  |||||||| |||||||||
|  | 127 | MESSAGE BYTE 238 |||||||| MESSAGE BYTE 239 ||||||||
| PAGES 33-60: TRANSMIT STATE STORE | 0-7 | STATE VARIABLE AND CHANNEL CONTROL REGISTERS SEE FIGURE 11 ||||||||||||||||
| PAGES 33-60: TRANSMIT HDLC STORE | 8 | MESSAGE BYTE 0 |||||||| MESSAGE BYTE 1 ||||||||
|  | ... |  |||||||| |||||||||
|  | ... |  |||||||| |||||||||
|  | 127 | MESSAGE BYTE 238 |||||||| MESSAGE BYTE 239 ||||||||

FIG. 10

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | CH DIS | AD DIS | | | | | | | | | | | | | | |
| 1 | BM FLG | | | | BIT COUNT | | | | | WORD COUNT | | | | | | |
| 2 | INPUT MONITOR REG | | | | | | ONES CNT | | | | | | | | | |
| 3 | | | | | | HF WD | | | | LAST ADDRESS + 1 | | | | | | |
| 4 | | | | | BM VAL | BM ERR | BOM CNT | | | BOM RCV REG | | | | | | |
| 5 | SAPI EXPECTED | | | | | | | | TEI EXPECTED | | | | | | | |
| 6 | CRC-16 CALCULATOR | | | | | | | | | | | | | | | |
| 7 | INSHIFT REGISTER | | | | | | | | | | | | | | | |

FIG. 11

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | BIP | MP | | | | | | | | | | | | | | |
| 1 | NOT USED | | | | | | | | | | | | | | | |
| 2 | CRC-16 CALCULATOR | | | | | | | | | | | | | | | |
| 3 | BIT COUNT | | | | STUFF CNT | | | | | MESSAGE COUNT | | | | | | |
| 4 | AD DIS | | | | | | | | XHF WD | LAST ADDRESS | | | | | | |
| 5 | | | | | | | | | BOM REGISTER | | | | | | | |
| 6 | SAPI | | | | | | | | TEI | | | | | | | |
| 7 | NOT USED | | | | | | | | | | | | | | | |

APPARATUS AND METHOD OF SHARING A STATE MACHINE FOR INPUT AND OUTPUT SIGNAL PROCESSING

TECHNICAL FIELD OF THE INVENTION

This invention relates generally to digital circuits and more particularly to a shared signal processor and method for sharing a state machine.

BACKGROUND OF THE INVENTION

In telecommunications equipment such as cross-connects, it is desirable for some applications to process a high number of high speed signals on a single circuit card. If many high speed signals can be processed by a single circuit card with reasonable power consumption and at reasonable cost, then the overall cost of the telecommunications switching equipment per channel may be reduced. Thus, in recent years, telecommunications equipment manufacturers have attempted to achieve higher density processing of telecommunications signals. Higher density processing allows more high speed telecommunication signals to be processed on a circuit board of a given size than was previously possible.

Many high speed telecommunications signals such as T1 or DS1 signals include a facility datalink signal. Facility datalink signals in a T1 or DS1 are typically four kilobit per second channels that are used for performance monitoring and high priority system messages between various pieces of telecommunication switching equipment. Facility datalink signals include HDLC formatted messages including 54016 messaging signals. Such signals are typically 14 byte signals comprising 8 data bytes, 2 address bytes, 2 CRC error correction code bytes, 1 byte of flag information, and 1 byte of control information. Such messages are sometimes referred to as PRM messages (performance report messages). Facility datalink signals may also use high priority messages known as BOM messages (bit oriented messages) which may contain a 1 byte abort signal and a 1 byte code message.

DS3 or T3 signals typically include 28 DS1s or 28 T1 signals, respectively. Because each DS1 or T1 typically includes a facility datalink signal, processing a DS3 or T3 signal will also require the processing of 28 individual facility datalink signals. Producing high density circuit cards to process multiple facility datalinks thus presents a problem. The use of multiple integrated circuits each capable of processing only a single facility datalink may be impractical due to space on the printed circuit board, the cost of the integrated circuits and their power consumption.

One technique that can be used to process multiple versions of a communications signal with the same integrated circuit is to employ a state machine capable of processing one channel that is shared among multiple channels. Of course, such a circuit must operate fast enough to process all of the channels simultaneously. There is a trade-off between speed and the amount of circuitry required to process multiple signals simultaneously. Existing shared state machines will often load and unload the state associated with a particular channel in a round-robin fashion. Such loading and unloading of state information, however, may be inefficient if the signal does not need to be processed at the time that its state is loaded into the shared state machine.

In processing multiple communication channels, it is sometimes unnecessary to process certain signals on an ongoing basis. Performance monitoring information and error messages such as are provided by facility datalink signals may be received infrequently and at varying time intervals. Thus, it is desirable to interrupt a microprocessor controlling the system to process a facility datalink signal only when such a signal indicates that some intelligent processing is required by the telecommunications equipment. Efficiently interrupting the microprocessor may become difficult, however, when a large number of facility datalink signals are processed simultaneously. Thus, a novel method of alerting a processor that a particular datalink needs to be processed is needed.

SUMMARY OF THE INVENTION

One aspect of the invention is a shared signal processor comprising input circuitry to receive a plurality of input signals and output circuitry operable to transmit a plurality of output signals. Storage circuitry is operable to store state information and signal data for each of the plurality of input signals and output signals. A state machine is coupled to the input circuitry, output circuitry, and storage circuitry and is operable to poll each input signal and output signal to identify a first signal requiring processing. The state machine is further operable to load the state information and signal data associated with the first signal and process the first signal.

The invention has several important technical advantages. The invention allows the processing of both input signals and output signals simultaneously. The invention allows the polling of input and output signals in a round-robin fashion to determine when they need processing. The shared state machine of the invention loads the state information for a given input signal or output signal only when that signal requires processing. Because the invention reduces the overhead required to process multiple input signals and output signals by reducing the amount of needless state information loaded into the state machine, throughput is improved and the processor may run at a lower clock speed. Running at a lower clock speed reduces the power consumption of the shared signal processor.

BRIEF DESCRIPTION OF THE DRAWINGS

For a more complete understanding of the present invention and the advantages thereof, reference is now made to the following descriptions taken in conjunction with the accompanying drawings, in which:

FIG. 1 illustrates a block diagram of a telecommunications switch constructed in accordance with the invention;

FIG. 2 illustrates a portion of an electrical circuit operable to process multiple facility datalink signals constructed in accordance with the invention;

FIG. 9 illustrates an exemplary memory map illustrating the organization of data in the dual port RAM illustrated in FIG. 2;

FIG. 10 illustrates an exemplary memory map illustrating the organization of receive state data for each page of receive state data stored in the dual port RAM of FIG. 2; and FIG. 11 illustrates an exemplary memory map illustrating the organization of transmit state data for each page of transmit state data stored in the dual port RAM of FIG. 2.

DETAILED DESCRIPTION OF THE INVENTION

Figure 3:
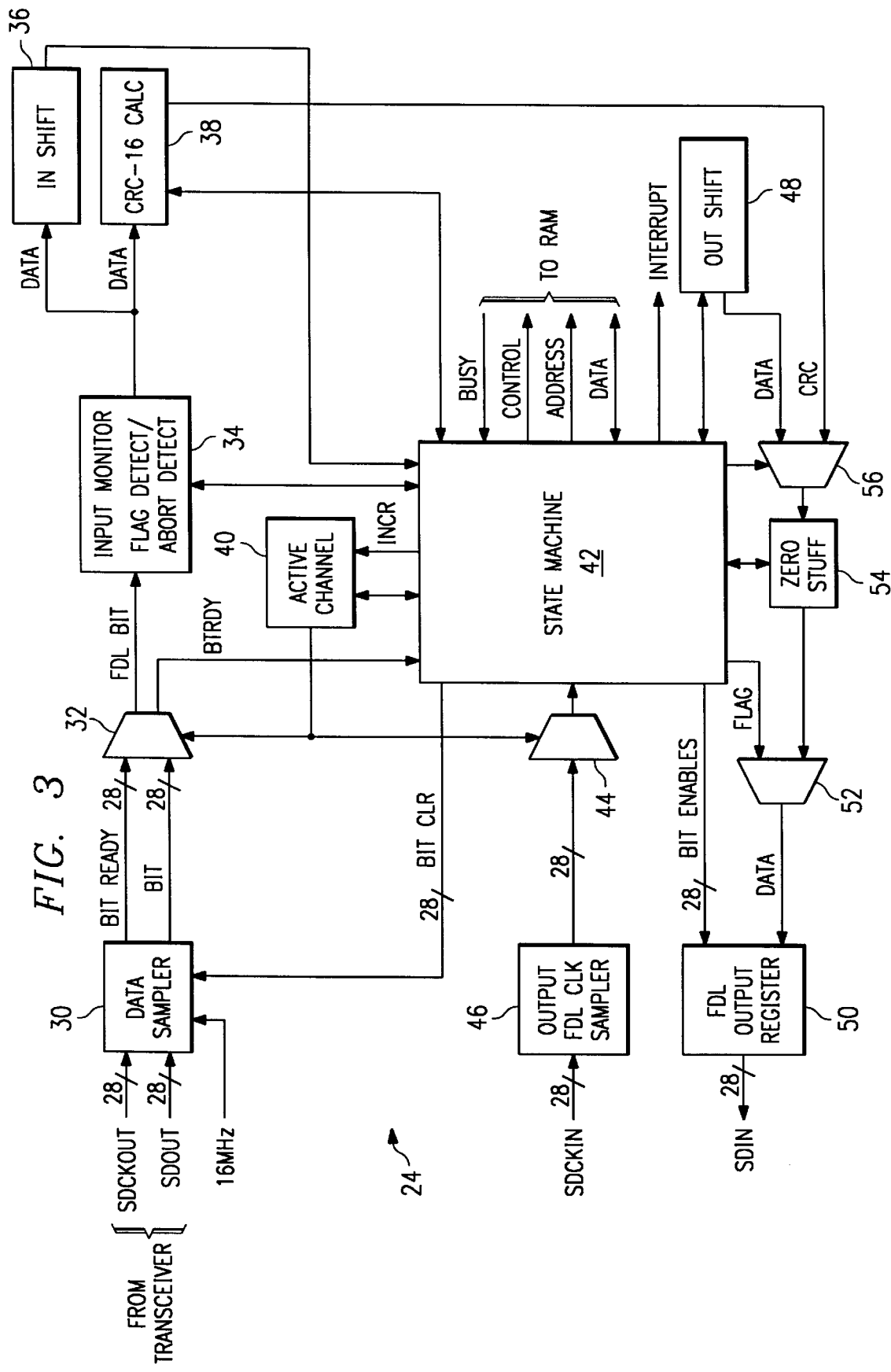
FIG. 3 illustrates a block diagram of an exemplary multichannel facility datalink processor constructed in accordance with the invention.

The preferred embodiment of the present invention and its advantages are best understood by referring to FIGS. 1–11 of the drawings, like numerals being used for like and corresponding parts of the various drawings.

FIG. 1 illustrates a telecommunications switch 10 constructed in accordance with the teachings of the invention. In this example, telecommunications switch 10 comprises a cross-connect but could be any type of telecommunications switch. Telecommunications switch 10 comprises one or more network interface cards 12 connected by a bus 15 to switching circuitry 14. Switching circuitry 14 is operable to switch a plurality of communications signals transmitted and received using network interface cards 12.

Here, network interface cards 12 comprise cards operable to receive one or more high speed telecommunication signals such as DS1 signals, T1 signals, DS3 signals and T3 signals. For example, network interface card 12 may be operable to process a DS3 signal or 28 DS1 signals. Similarly, network interface card 12 may be operable to process one T3 signal or 28 T1 signals. As; described above, these high speed telecommunications signals frequently include facility datalink signals. Network interface card 12 is operable to process multiple facility datalink signals.

Network interface card 12 comprises input circuitry 16 which is operable to receive a plurality of communication signals comprising a plurality of facility datalink signals. Network interface card 12 further comprises output circuitry 18 which is operable to transmit a second plurality of high speed communication signals which further comprise a second plurality of facility datalink signals. Switching circuitry 14 is operable to switch ones of the plurality of communication signals received by input circuitry 16 for transmission using output circuitry 18.

Network interface cards 12 further comprise facility datalink circuitry 20 which is operable to process multiple facility datalink signals received by network interface cards 12 and generate multiple facility datalink signals output by network interface cards 12. Facility datalink circuitry 20 may include a multichannel facility datalink processor that will be described in more detail below. Facility datalink circuitry 20 may also include a dual port random access memory (RAM) and a microprocessor. The microprocessor may be used to control the operation of network interface cards 12 and although comprising a portion of facility datalink circuitry 20 may also comprise a portion of other circuitry such as input circuitry 16, output circuitry 18 or control and timing circuitry (not explicitly shown). Facility datalink circuitry 20 of the present invention may be used in any type of telecommunications switching equipment.

FIG. 2 illustrates a block diagram of a portion of an electrical circuit operable to process multiple facility datalink signals. The circuitry illustrated in FIG. 2 may reside on a network interface card 12 such as is illustrated in FIG. 1, for example. Alternatively, the circuitry in FIG. 2 could reside on separate electric circuit cards.

The circuit illustrated in FIG. 2 comprises transceivers 22, multichannel facility datalink processor 24, microprocessor 26, and dual port RAM 28. The multichannel facility datalink processor 24 illustrated in FIG. 2 is operable to process 28 input facility datalink signals and 28 output facility datalink signals. Accordingly, the discussion below is based upon this capacity for multichannel facility datalink processor 24. The techniques disclosed herein, however, could be used to process more or less than 28 input and output facility datalink signals. In addition, some of the novel techniques disclosed herein could be used for applications other than processing multiple facility datalink signals and for applications outside of the telecommunications realm.

Multichannel facility datalink processor 24 is connected to 28 transceivers 22. Each transceiver is operable to extract a facility datalink signal from an input DS1 or T1 signal. Each transceiver 22 is further operable to inject a facility datalink signal into an output DS1 or T1 signal. Although the example illustrated in FIG. 2 uses 28 separate transceivers for extracting and injecting facility datalink signals from and to DS1 or T1 communication signals, alternative transceivers 22 may be used that are operable to process more than one input and output facility datalink signal or are capable of only handling input facility datalink signals or output facility datalink signals individually. For received facility datalink signals, each transceiver 22 outputs a serial facility datalink data signal and a serial facility datalink clock signal that is synchronized with the facility datalink data signal. In addition, each transceiver produces a facility datalink clock signal for facility datalink signals output by multichannel facility datalink processor 24. This clock signal is used to clock facility datalink data signals from multi-channel facility datalink processor 24 into one of the transceivers 22.

Multichannel facility datalink processor 24 is also connected to dual port RAM 28 and microprocessor 26. Microprocessor 26 may also handle additional control functions beyond the processing of facility datalink signals. When a PRM message, BOM message, or 54016 message has been received by multichannel facility datalink processor 24 on one of the facility datalink inputs, microprocessor 26 is interrupted to process the message. The novel interrupt scheme of the present invention will be described more fully below. Microprocessor 26 may also provide data to and receive data from dual port RAM 28. Facility datalink messages to be transmitted using multichannel facility datalink processor 24 may be sent by microprocessor 26 to dual port RAM 28. Control information may be used to signal multichannel facility datalink processor 24 that a message has been placed in dual port RAM 28 for transmission. In addition to storing message data in dual port RAM 28, state variables used by multichannel facility datalink processor 24 to control the processing of the various facility datalink signals may be stored in dual port RAM 28.

Multichannel facility datalink processor 24 employs a shared state machine to process facility datalink signals. When a particular facility datalink signal requires processing, then the state information for that facility datalink signal is loaded from dual port RAM 28 into multichannel facility datalink processor 24. Following the processing of the currently available bit for that facility datalink signal, the facility datalink data and state information is restored from multichannel facility datalink processor 24 to dual port RAM 28 until the next bit of the facility datalink signal is received. The multichannel facility datalink processor 24 monitors the facility datalink on each of the 28 input DS1 signals for HDLC and BOM messages. The multichannel facility datalink processor 24 also generates facility datalink messages for each of the 28 output signals for both HDLC and BOM messages.

Multichannel facility datalink processor 24 employs a state machine that is shared between the 28 input and output signals. In this embodiment, multichannel facility datalink processor 24 operates at 16.128 MHZ, thus providing a number of internal states with which to operate on each facility datalink signal. State variables for each facility datalink signal are stored in dual port RAM 28 and loaded back into the state machine so that operations may be performed for each bit of the facility datalink signal. Upon completion of the operation, the state information and data information is stored back into dual port RAM 28. This process is conducted on a round robin basis. That is, multichannel facility datalink processor 24 monitors the clock input for each facility datalink input signal and each facility datalink output signal. Multichannel facility datalink processor 24 uses edge detectors to detect edge transitions of the clock signals for both the input and output facility datalink clocks. When the appropriate clock edge is detected, then the state information is loaded from dual port RAM 28 into multichannel facility datalink processor 24, the facility datalink data bit for that channel is processed and the revised state information and data information is restored to dual port RAM 28.

Note that this process takes place only after a clock transition. If a clock transition is not detected, then multichannel facility datalink processor 24 bypasses that channel and goes on to the next channel without loading any state information from dual port RAM 28 into multichannel facility datalink processor 24. This feature of the invention avoids the overhead required to load state information for facility datalink channels that are not ready for processing. Thus, multichannel facility datalink processor 24 polls the clocks for the 56 facility datalink channels (28 inputs and 28 outputs) and processes only those requiring processing at that time.

FIG. 3 illustrates a block diagram of a multichannel facility datalink processor 24 constructed in accordance with the invention. Multichannel facility datalink processor 24 comprises data sampler 30, multiplexer 32, input monitor 34, input shifter 36, CRC calculator 38, active channel counter 40, state machine 42, multiplexer 44 output clock sampler 46, output shifter 48, FDL output register 50, multiplexer 52, zero stuffer 54 and multiplexer 56. All of the parts of multichannel facility datalink processor 24 could be considered to be parts of a state machine.

Data sampler 30 receives a 16 MHZ system clock. Other clock speeds could be used without departing from the scope of the invention. Data sampler 30 also receives 28 facility datalink clocks and 28 facility datalink input signals. Data sampler 30 samples the facility datalink clock signals until a rising edge is detected. In this embodiment, a separate data sampler circuit is used for each of the 28 input channels, thus allowing simultaneous sampling of both the facility datalink clock signal and facility datalink input signal for each channel. This embodiment uses the rising edge of the facility datalink clock signal to determine when data is ready. Alternatively, a falling edge detection or level detection scheme could be used. When a rising edge has been detected, then the available data bit for the corresponding facility datalink channel is sampled and the data bit ready signal is set for that channel. After the appropriate data bit has been processed, the data bit ready signal for that channel is cleared by state machine 42 using one of the 28 bit clear signals.

The 28 bit ready signals and 28 facility datalink bit signals are sent to multiplexer 32 which is capable of selecting one of the 28 bit ready signals to be sent to state machine 42 and one of the 28 facility datalink input bit signals to be sent to input monitor 34. The selection of the appropriate bit is controlled by active channel counter 40, which will be described more fully below.

Any of the hardware structures in multichannel facility datalink processor 24 could be implemented in a different manner from that illustrated in FIG. 3 without departing from the scope of the invention. In this embodiment, multichannel facility datalink processor 24 was designed using a hardware description language. Accordingly, FIG. 3 represents a functional view of multichannel facility datalink processor 24. After inputting this functional description into a computer using a hardware description language, the actual circuitry generated may vary from this functional block diagram.

Active channel counter 40 is used to control the input: or output channel being processed. In this embodiment, there are 28 input channels and 28 output channels. Active channel counter 40 comprises a counter which is incremented by state machine 42 each time a channel processing step is completed, and a bit that indicates whether input or output channels are being processed. The counter portion counts from one to 28 and resets. Active channel counter 40 alternates between selecting inbound and outbound channels for processing. In effect, then, active channel counter 40 acts more like a modulo 56 counter, cycling through the 28 input channels followed by the 28 output channels. Active channel counter 40 also serves as a page address for accessing dual port RAM 28, as will be described below. For this reason, as will become apparent, active channel counter 40 does not count from one to 56. Instead, it counts from one to 28, alternating the input/output bit each time 28 is reached. Although in this embodiment the input channels and output channels are monitored in a round robin fashion, these channels could be monitored in any order.

Input monitor 34 receives facility datalink data bits from multiplexer 32 when a particular facility datalink channel is ready for processing. Input monitor 34 watches the input data stream to detect flags and abort sequences. Input monitor 34 also contains a stuffed zero detector to remove any non-data zeroes inserted by the facility datalink message source.

To perform flag detection, abort detection, and zero destuffing, input monitor 34 needs more than just a single bit for a particular facility datalink channel. Accordingly, when state machine 42 receives a bit ready signal indicating that a particular input channel is ready for processing, the previous state of that channel is loaded into state machine 42, including previous data bits received. Previous data bits received may be loaded into input monitor 34 so that input monitor 34 may perform the functions of flag detection, abort detection, and zero destuffing. In this embodiment, input monitor 34 comprises an 8-bit register plus a 4-bit counter that counts the number of ones received consecutively. The state of the 4-bit counter is restored when the state of a particular facility datalink channel is restored to state machine 42. The 4-bit counter is incremented if the new facility datalink data bit received is a 1 and the counter is cleared if that bit is a 0. If the counter reaches five and the sixth bit received is 0, then a signal is set to perform zero destuffing and the counter is cleared. If the counter reaches six and the seventh bit is 0, then a flag detect signal is set. If the counter reaches a value greater than or equal to seven, then an abort is detected. The 8-bit register in input monitor 34 will store data bits received except for stuffed zeroes. Alternative methods of handling input data could be used without departing from the scope of the invention.

Input shifter 36 receives the input data stream. The input data stream is shifted through input shifter 36 in order to format the data for storage in dual port RAM 28. In this embodiment, the data is stored in words containing two octets. Input shifter 36 is also the source for comparing SAPI and TEI to the expected value. In this embodiment, shifting is accomplished by a 1-bit offset of the read and write bus interfaces of input shifter 36 to the RAM interface contained in state machine 42.

CRC calculator 38 performs a serial CRC calculation on a facility datalink data stream. CRC calculator 38 is shared between the input and output facility datalink signals. For inbound facility datalink messages, when the end of message flag is detected then the value in the CRC calculator should be 1B0F (hexadecimal). In the output direction, the CRC is calculated over the outgoing message. After the final message octet, the value in the CRC calculator is inverted and shifted out before attaching the end of message flag.

Output shifter 48 is a 16-bit shift register that is loaded with an output facility datalink message. The output message is shifted into CRC calculator 38 and in parallel into zero stuffer 54 through multiplexer 56. Multiplexer 56 may be used to select between the output of CRC calculator 38 and the output of output shift register 48.

Zero stuffer 54 performs the zero stuffing function for an output facility datalink message. Outbound address, message, and CRC bits are monitored for consecutive ones. Whenever five consecutive ones are detected, then a 0 is inserted into the outbound data stream by zero stuffer 54. In this embodiment, zero stuffer 54 comprises a 3-bit counter. Each time a 1 is transmitted, the counter is incremented. Each time a 0 is transmitted, the counter is reset. When the count indicates that five 1s have been sent, then the circuit places a 0 in the outgoing stream. A signal informs state machine 42 that the current new bit to be transmitted was rejected in favor of the stuff bit.

Facility datalink output register 50 comprises a 28-bit register that holds one bit for each of the 28 output facility datalink channels. Facility datalink output register 50 receives data from zero stuffer 54 or the flag output from state machine 42 as controlled by multiplexer 52. The flag output from state machine 42 is used when a flag signal is to be generated on the facility datalink output. State machine 42 supplies bit enable signals so that the appropriate bit may be clocked into the appropriate one of the 28 bits in facility datalink output register 50.

Output clock sampler 46 samples the 28 output clocks received from transceivers 22. When a rising edge is detected, output clock sampler 46 supplies the detection to state machine 42 through multiplexer 44. Multiplexer 44 will supply the appropriate condition of the clock edge detector for the current channel being monitored as indicated by active channel counter 40 to state machine 42. When a rising edge is detected, then the facility datalink output register 50 will output the bit associated with the clock whose edge has been detected and state machine 42 is triggered to supply the next bit for that facility datalink signal to facility datalink output register 50. Again, falling edge or level detection could also be used depending upon the particular design of the transceiver circuits and multichannel facility datalink processor 24.

As will be described in more detail below, state machine 42 comprises four state machines that operate hierarchically. A controller state machine passes control to the input state machine which processes and stores received messages. In addition, the controller state machine may pass control to an output state machine which formats and transmits outbound messages. Each of the input and output state machines may make use of a RAM interface state machine which processes read and write requests from the input and output state machines to dual port RAM 28.

Although the operation of multichannel facility datalink processor 24 will be described more fully below, some of the details of its operation will now be discussed. As has been previously discussed, state machine 42 comprises a shared state machine capable of processing a single input or a single output facility datalink signal. Thus, the state information for state machine 42 for each of the 28 input and 28 output facility datalink signals is stored in dual port RAM 28. State machine 42 monitors the 28 input and 28 output signals in a round robin fashion to determine whether processing of an input or an output is needed. Active channel counter 40 is used to cycle through all 56 channels.

When a particular channel requires processing, then its state information is restored from dual port RAM 28 to state machine 42. In addition, the data required by input monitor 34, input shifter 36, CRC calculator 38 and output shift register 48 may be restored to the multichannel facility datalink processor 24. Accordingly, multichannel facility datalink processor 24 achieves higher throughput by incurring the overhead of restoring the state of a particular facility datalink channel only when that particular channel requires processing. If the channel does not require processing, then the state information is not loaded, the active channel counter 40 is incremented, and the process repeats for the next channel. The reduced overhead also allows the clock speed of multichannel facility datalink processor 24 to be slower than it might have to be otherwise.

If a channel had to be processed, then state machine 42 takes the required action based upon the state information and the bit received or the bit to be transmitted. Following this action, updated state information and updated data may be restored to dual port RAM 28 until the next time the particular facility datalink signal needs to be processed. In this embodiment, multichannel facility datalink processor 24 resides on a separate circuit from dual port RAM 28. Alternatively, multichannel facility datalink processor 24 and dual port RAM 28 could comprise part of the same integrated circuit.

Figure 4:
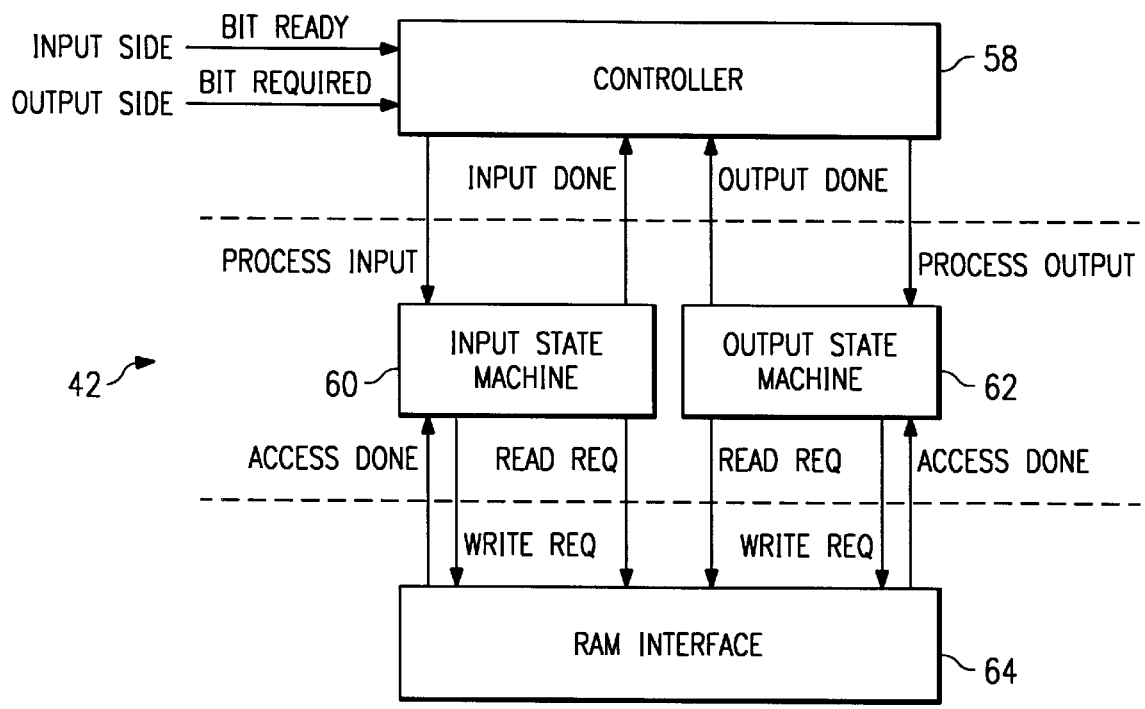
FIG. 4 illustrates a block diagram of an exemplary state machine that may be used in the multichannel facility datalink processor illustrated in FIG. 3.

FIG. 4 illustrates a block diagram of an exemplary state machine 42 constructed in accordance with the invention. In this example, state machine 42 comprises a hierarchical state machine. At the first level of the hierarchy is controller state machine 58. At the second level of the hierarchy are input state machine 60 and output state machine 62. Finally, at the third level of the hierarchy, RAM interface state machine 64 is shared by input state machine 60 and output state machine 62. Although state machine 42 is a hierarchical state machine, a non-hierarchical state machine could be used without departing from the scope of the invention. In addition, if a hierarchical state machine is employed for state machine 42, then fewer or greater levels of hierarchy could be employed without departing from the scope of the invention.

Control between the various levels of the state machine is passed vertically by one level by the use of handshake signals. Controller state machine 58 pulses process input or output to pass control to input state machine 60 and output state machine 62, respectively. Controller state machine 58 then waits for the input done or output done signal to resume operation. Input state machine 60 and output state machine 62 operate on the current bit each time they get a process signal from controller state machine 58. When the current bit has been processed, then the done indicator is pulsed to return control to controller state machine 58. During bit processing, RAM accesses may be required. Read/Write requests are issued to pass control from input state machine 60 and/or output state machine 62 to RAM interface state machine 64. When RAM interface state machine 64 has completed a memory access, then an access done signal returns control to the calling state machine.

Controller state machine 58 sits at the top level of the hierarchy. When active, it polls the current channel indicated by active channel indicator 40 for a bit ready indicator if the active channel counter is pointing to an input facility link signal. Controller state machine 58 looks for a bit required indicator if the active channel counter is pointing to an output facility datalink channel. If a bit ready or bit required signal is present, then controller state machine 58 pulses the process input or process output handshake signal to pass control to the appropriate second level state machine and the controller state machine 58 becomes inactive. If the indicator for the channel is not set, then the controller state machine 58 increments the active channel counter 40 and repeats. When inactive, the controller state machine 58 waits for input done or output done indicators from the level two state machines before incrementing the active channel counter 40 and continuing. The flow diagram for controller state machine 58 is described more fully below in connection with FIG. 5.

When input state machine 60 is activated, it sends timing and control signals to input monitor 34, input shifter 36 and CRC calculator 38. Input state machine 60 tracks message type and bit and byte positions within the message and provides operations appropriate for the state. RAM accesses are made as required for operations during the sequence. When the current received bit has been processed, including updating all modified state variables in dual port RAM 28, then the input done signal is asserted to release control back to controller state machine 58. Input state machine 60 is responsible for validating and storing the received message and interrupting microprocessor 26. The flow diagram for input state machine 60 is described more fully below in connection with FIGS. 7A–7B.

Output state machine 62, when activated, sends timing and control signals to zero stuffer 54, output shifter 48, and CRC calculator 38. Output state machine 62 tracks message type and bit and byte positions within the message and performs operations appropriate for the state. RAM accesses are made as required for operations during the sequence. When the current bit has been processed and delivered for transmission, then the output done signal is asserted to release control to controller state machine 58. The flow diagram for output state machine 62 is described more fully in connection with FIGS. 8A–8C below.

RAM interface state machine 64 accepts read and write requests from the input state machine 60 and output state machine 62. Write requests are accompanied by the data to be written. All requests include the address to be accessed. RAM interface state machine 64 provides all timing, control, and data signals to dual port RAM 28. The busy line is monitored for RAM arbitration. Read data is captured and stored in a 16-bit register. The flow diagram for RAM interface state machine is described more fully in connection with FIG. 6 below.

Figure 5:
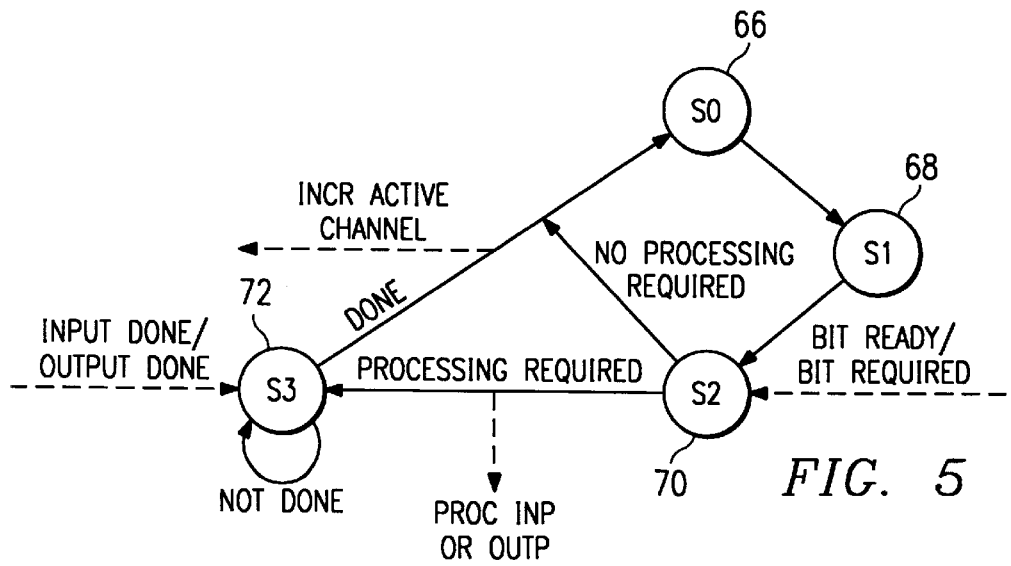
FIG. 5 illustrates a state diagram for the exemplary controller state machine illustrated in FIG. 4.

FIG. 5 illustrates a state diagram for controller state machine of FIG. 4. Controller state machine 58 is initialized in state s0. Control then proceeds to state s1. Various internal functions are performed during these states. In state s2, it is determined whether a bit ready or bit required indicator has been set. The particular indicator accessed depends upon the state of active channel counter 40. Controller state machine 58 will examine either the bit ready or bit required indicator for the channel indicated by active channel counter 40. If no processing is required, then the active channel counter 40 is incremented and the state returns to state s0. If processing is required, then a process input or process output pulse is generated as appropriate to either input state machine 60 or output state machine 62 and controller state machine 58 proceeds to state s3. In state s3, controller state machine 58 constantly monitors the status of the input or output done signals from input state machine 60 and output state machine 62, respectively, as is appropriate. If the done signal has not been received, then controller state machine 58 remains in state s3. If an input done or output done signal is received, then the active channel counter 40 is incremented and controller state machine 58 returns to state s0. FIG. 5 provides only one example of a state diagram that could be used for controller state machine 58. Other state machine functionality could be provided by controller state machine 58 without departing from the scope of the invention.

Figure 6:
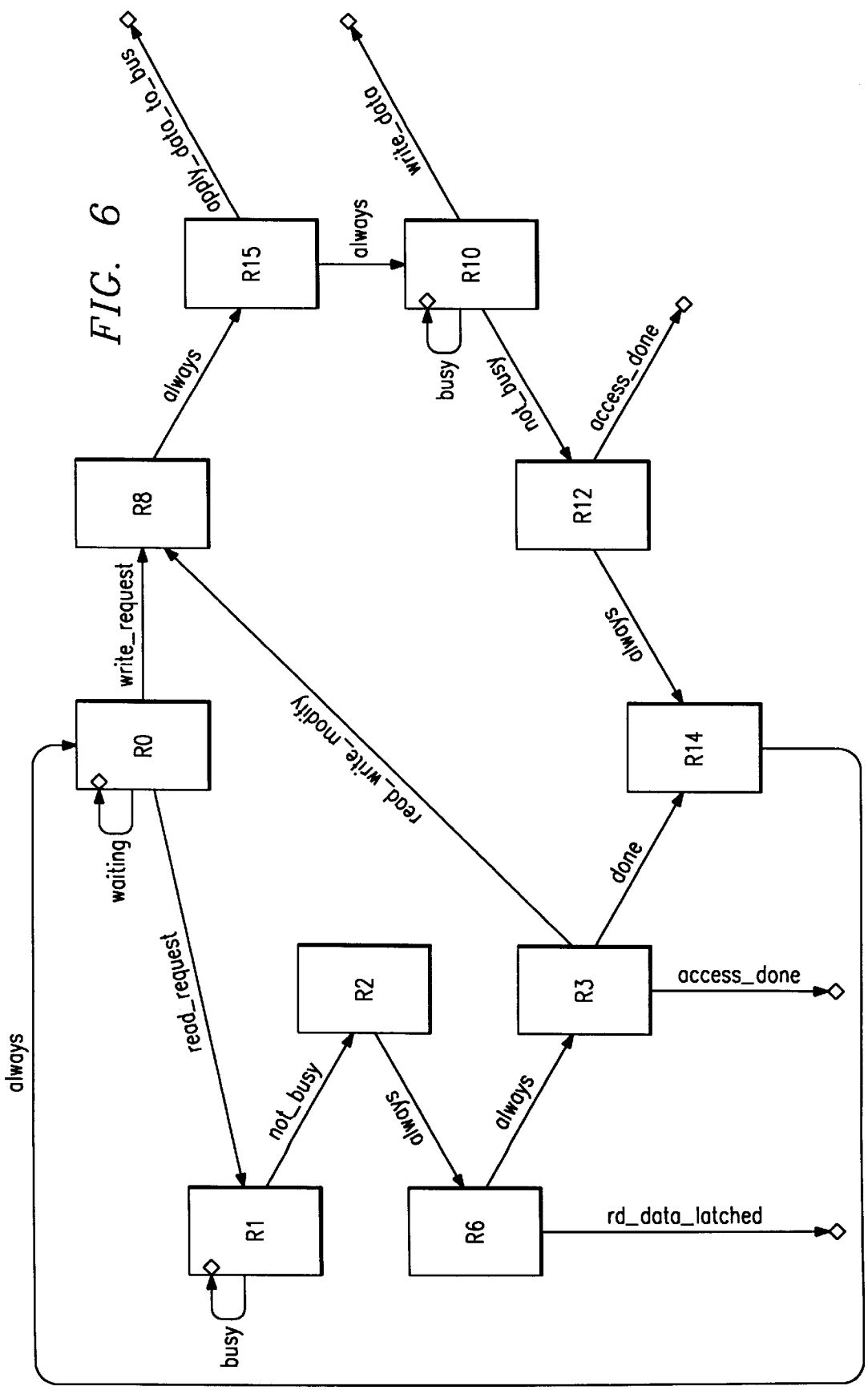
FIG. 6 illustrates a state diagram for the exemplary RAM interface state machine illustrated in FIG. 4.

FIG. 6 illustrates a state diagram of an exemplary RAM interface state machine 64 illustrated in FIG. 3. Like the controller state machine state diagram illustrated in FIG. 5, the state diagram illustrated in FIG. 6 provides only one example of the functionality of a RAM interface state machine constructed in accordance with the invention. RAM interface state machine 64 could be designed to have different behavior without departing from the scope of the invention.

When a read request or a write request is received from input state machine 60 or output state machine 62, RAM interface state machine 64 begins in state r0. It should be noted that input state machine 60 and/or output state machine 62 may also generate a read-modify-write request for handling of atomic operations. In such a situation, then both the read request and write request signals will be asserted by input state machine 60 or output state machine 62. In state r0, RAM interface state machine 64 constantly waits for a read request, a write request or a read-modify-write request. If a write request is received, then the state machine moves to state r8. If a read request or a read-modify-write request is received, then RAM interface state machine 64 moves to state r1. In state r1, RAM interface state machine 64 monitors the busy signal of dual port RAM 28. If dual port RAM 28 is busy, then RAM interface state machine remains in state r1. If dual port RAM 28 is not busy, then RAM interface state machine proceeds to state r2 where the address and control signals are provided to dual port RAM 28. Then, in state r6, the data to be read is latched into RAM interface state machine 64 as indicated in FIG. 6 by the arrow protruding from state r6. Next, in state r3, the access done signal is generated as indicated by the arrow protruding from state r3, provided that the access was a read request. Then, if a read request was being processed, the state of RAM interface state machine 64 proceeds to state r14. After state r14, RAM interface state machine 64 returns to state r0 to await further RAM access requests.

Returning to state r3, if a read-modify-write request was received by RAM interface state machine 64, then instead of generating the access done signal, RAM interface state machine 64 instead moves to state r8. In state R8, the address and control signals are set up to be applied to dual port RAM 28. Next, in state r15 the data to be written to dual port RAM 28 is applied to the bus as indicated by the arrow protruding from state r15. In state r10 it is determined whether the RAM is busy. If so, then RAM interface state machine 64 remains in state r10. If not, then the data is written to dual port RAM 28 and RAM interface state machine 64 proceeds to state r12. In state r12 the access done signal is generated as indicated by the arrow protruding from state r12. Following the generation of the access done signal, RAM interface state machine enters state r14.

Figure 7A:
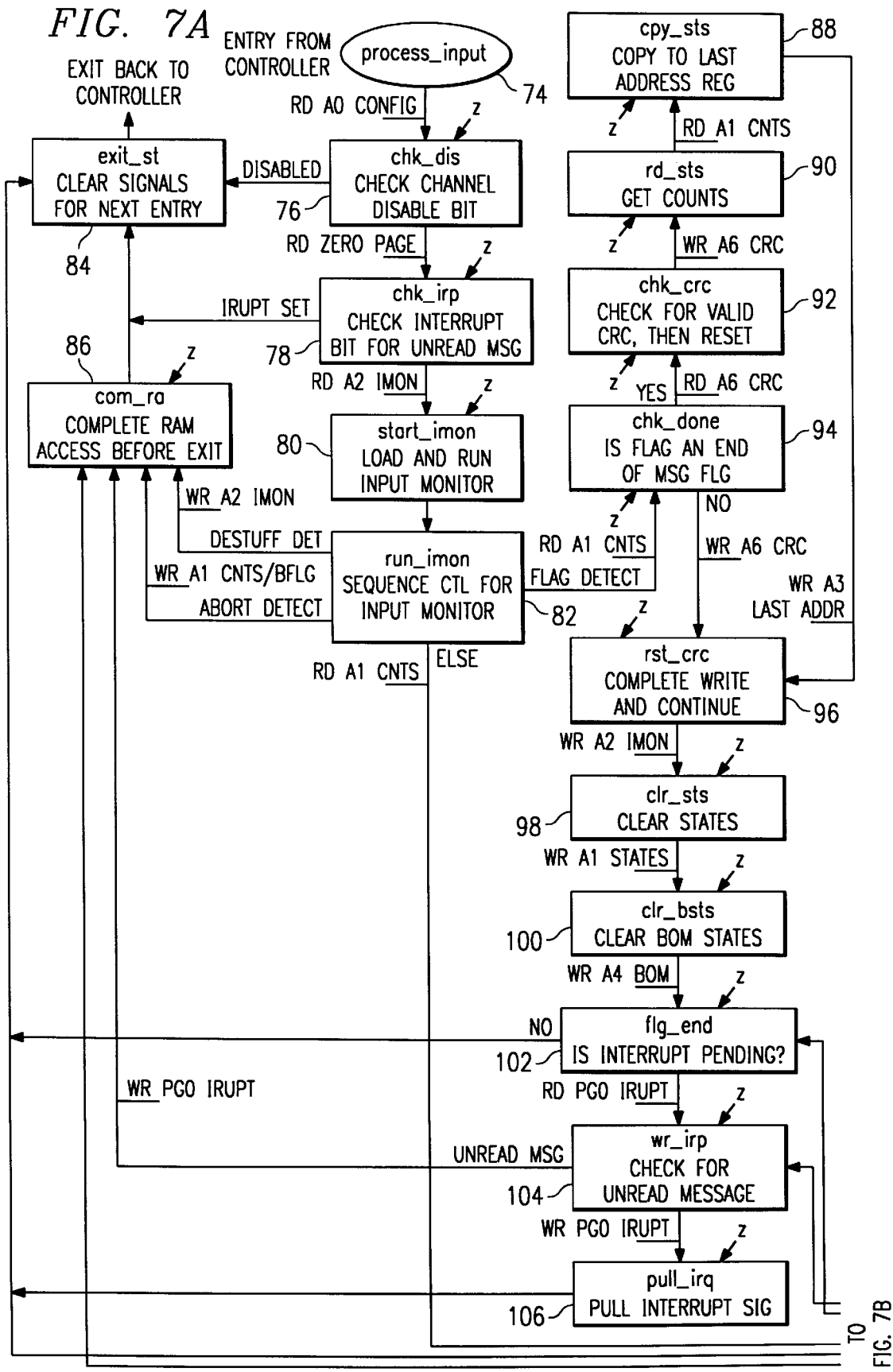
FIGS. 7A–7B illustrates a state diagram for the exemplary input interface state machine illustrated in FIG. 4.
Figure 7B:
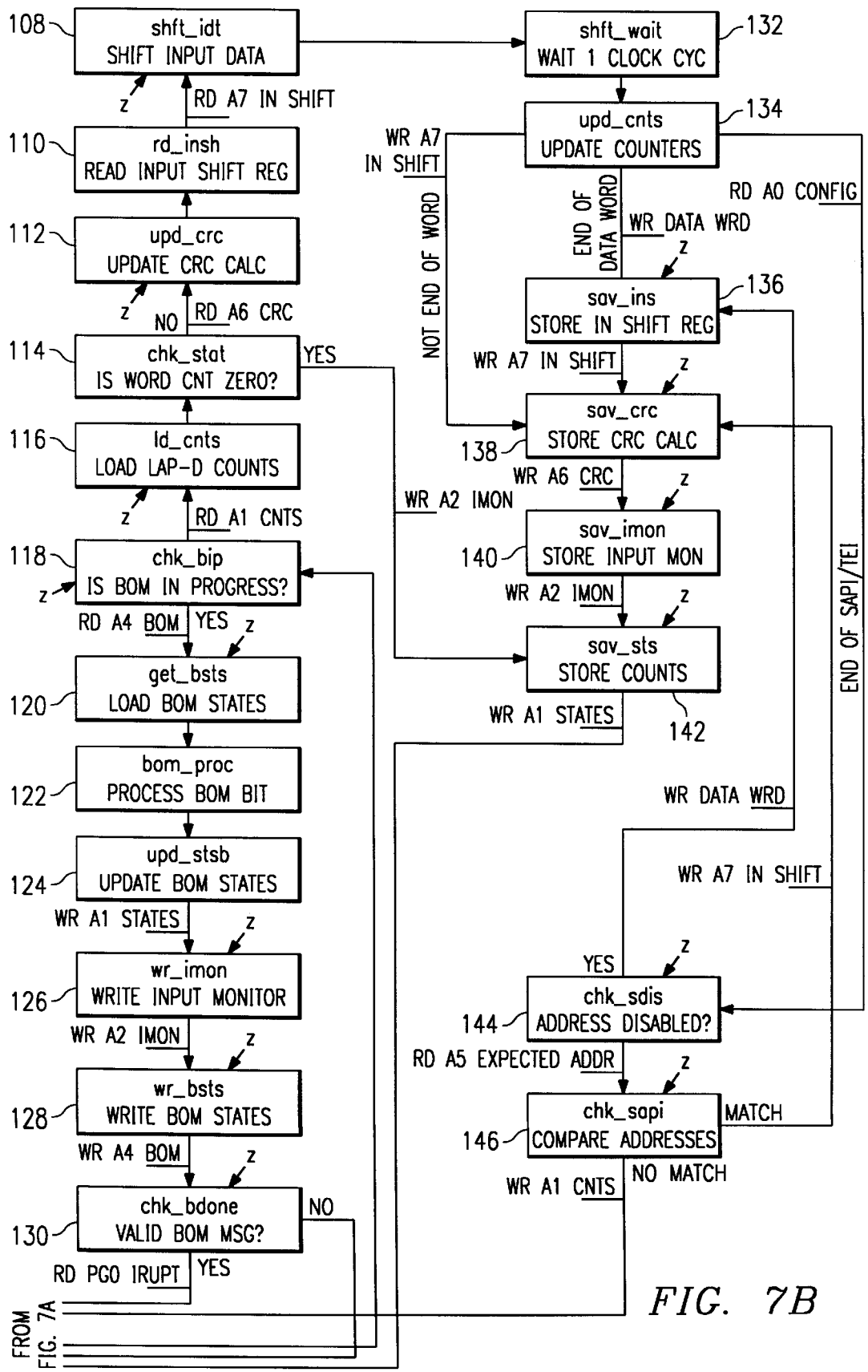

FIGS. 7A–7B show an exemplary state diagram illustrating the operation of input state machine 60. As was described for controller state machine 58 and RAM interface state machine 64, alternative functionality could be provided for input state machine 60 without departing from the scope of the invention. FIGS. 7A–7B provide only one example of a state diagram that could be used for input state machine 60.

For clarity in describing FIGS. 7A–7B and 8A–8C, one should note that each box represents a state of input state machine 60 or output state machine 62. Often, there is a line segment attached to the arrows linking a particular state to another state. The line segment indicates a memory access, the type of the access, and the data accessed. An arrow with a "Z" indicates that the transition to the next state will not take place until the memory access has completed.

In state 74, input state machine 60 receives a process input signal from controller state machine 58. After receiving the signal, the channel configuration for the input channel indicated by active channel counter 40 is read. The notation in FIGS. 7A–7B indicates that address a0 is read to obtain the configuration information. In this embodiment, each input and output channel is associated with a page of memory in dual port RAM 28 that contains state information and another page that contains message data. Each page of state information comprises eight 16-bit words which are addressed using an address value from 0 through 7 and the channel number of the active channel counter 40. Such addressing will be described more completely in connection with FIGS. 9–11 below. Here, to simplify the discussion, when a read or write is made to an address a0–a7, that should be interpreted to be the address of the 16-bit word for the received state or transmit state associated with the channel currently being pointed to by active channel counter 40. In addition, as will be described more completely with respect to FIG. 9 below, interrupt information for each of the 28 input facility datalink signals is stored on a page known as page zero of dual port RAM 28. Similarly, transmit ready indicators for BOM and HDLC formatted messages for each of the output channels are stored on page zero in dual port RAM 28. This page will be referred to as page zero or the zero page.

Returning to the read that was conducted in step 74, address a0 is read to retrieve the configuration information for the input data channel being processed by input state machine 60. As described above, input state machine 60 waits until the read access is complete before proceeding to step 76 as indicated by the arrow pointing to state 76 with the letter "Z" at its leading edge. To simplify the discussion herein, the discussion of waiting for the completion of a memory access will not be repeated for the discussion of the remainder of FIGS. 7A–7B and 8A–8C.

In step 76, the channel disable bit is checked. If the channel is disabled, then input state machine 60 proceeds to state 84. State 84 is an exit state. In this state all of the signals for input state machine 0 are cleared to handle the next channel and input state machine 60 returns control back to controller state machine 58 by generating an input done signal.

Returning to state 76, if the input channel to be processed is not disabled, then the zero page is read and input state machine 62 transitions to state 78. In state 78, the interrupt bit for the appropriate input channel is checked to determine whether the interrupt bit is set. If an interrupt bit is set, then, as will be described more fully below, there is a message that has not yet been read by processor 26 and the current input is to be ignored. Thus, if the interrupt bit is set for the input channel being processed, then input state machine 60 transitions to state 84. If the interrupt bit is not set, then the input monitor states are read from address a2. Following this read in state 80, input monitor 34 is loaded and run. In state 82, the input monitor 34 is sequenced and the control information monitored. If input monitor 34 detected a zero to be destuffed, then the input monitor information is updated by writing to address a2 and input state machine 60 transitions to state 86 to wait for the completion of the RAM access before continuing on to state 84. Similarly, if an abort message was detected, then the bit count, word count, and BOM message flag are updated by writing address a1 and input state machine 60 transitions to state 86.

If, in state 82, a flag was detected, then the bit count and word count are retrieved by reading address a1 and input state machine 60 transitions to state 94. Otherwise, the bit count and word count are read from address a1 and input state machine 60 transitions to state 118.

Returning to state 94, if the flag detected was an end of message flag, then the CRC calculator 38 contents are read from address a6 and input state machine 60 transitions to state 92. If, however, the flag was not an end of message flag in state 94, then all ones are written to address a6 to initialize the CRC register and input state machine 60 transitions to state 96.

Returning to state 92, input state machine 60 checks for a valid CRC and then resets CRC calculator 38. Also, if the CRC was valid, then a temporary interrupt pending flag is set. This temporary flag is an internal value that is not stored to memory. The contents of CRC calculator 38 are then written to address a6 and input state machine transitions to state 90. In state 90, the bit count and word count are retrieved by reading address a1. Then, in state 88, the bit count and word count are copied to the last address register by writing to address a3 and input state machine 60 proceeds to state 96.

In state 96 input state machine 60 waits for the previous write to complete and then writes the status of input monitor 34 to dual port RAM 28 by writing to address a2. Next, in state 98 the bit count and word count are cleared and then written to address a1. Then, in state 100 the BOM state information is cleared and written to address a4. Then, in state 102, it is determined whether an interrupt is pending. If an interrupt is not pending, then input state machine 60 transitions to state 84 for exit. If an interrupt is pending, then input state machine reads the interrupt information from page zero and transitions to state 104.

In state 104, it is determined whether there is an unread message. If an unread message exists for the input channel being processed, then the interrupt information is written to page zero and input state machine 60 transitions to state 86. If no unread message exists, then the page zero interrupt information is written to page zero and input state machine 60 transitions to state 106. In state 106, a poll interrupt signal is generated to microprocessor 26 and input state machine 60 proceeds to state 84.

Returning to state 118, it is determined whether a BOM message is currently in progress. If not, the bit count and word count are read from address a1 and input state machine 60 transitions to state 116 where these counts are loaded into input monitor 34. Then, in state 114 it is determined whether the word count is equal to zero. If the word count is equal to zero, then the state of input monitor 34 is written to address a2 and input state machine 60 transitions to state 142. If the word count is not equal to zero, then the CRC value is read from address a6 and the CRC calculation is updated in state 112. Next, in state 110, the value of the input shift register is read from address a7 and stored in input shifter 36. The input data is then shifted into input shifter 36 in state 108. Next, in state 132, input state machine 60 waits one clock cycle before transitioning to state 134.

In state 134, the counters are updated, including the bit counter, word counter, and the ones counter in input monitor 34. If the end of a data word has been reached, then input state machine 60 writes the data word to dual port RAM 28 and transitions to state 136. When the end of data word has been reached and the word counter indicates the position of the SAPI/TEI, then the configuration is read from address a0 and input state machine 60 transitions to state 144. If the end of a data word has not been reached, then the contents of input shifter 36 are written to address a7 and input state machine 60 transitions to state 138. Similarly, if the end of a data word was reached and written to memory then in state 136 the contents of input shifter 36 are stored at address a7 and input state machine 60 transitions to state 138.

In state 138 the contents of CRC calculator 38 are stored by writing them to address a6. Next, in state 140, the contents of input monitor 34 are stored by writing those contents to address a2. Then, in state 142, the bit counter and word counter of the input monitor are stored in address a1 and input state machine 60 transitions to state 86.

Returning to state 144, it is determined whether the address is disabled or not. If so, then the data word is written to dual port RAM 28 and input state machine 60 returns to state 136. If the address is not disabled, then the expected SAPI and expected TEI addresses are read from address a5. Then, in state 146 the address is compared with the expected value. If a match is found, then input state machine 60 transitions to state 138. If no match is found, then the bit counter and word counter are written to address a1 and input state machine 60 transitions to state 102.

Returning to state 118, if a BOM message was in progress, then the BOM register was read from address a4 and input state machine 160 transitioned to state 120. In state 120, the BOM state information is loaded, the next BOM bit is processed in step 122 and the BOM state information is updated in state 124 by writing the information to address a1. Then, in state 126, the contents of the ones counter and input monitor register are written to address a2. In state 128, the BOM state information is written to address a4. In state 130 it is determined whether or not a valid BOM message has been generated. If not, then input state machine 60 transitions to step 84 for exit. If a valid BOM message has been generated, then in state 104 input state machine 60 checks for an unread message. If there is an unread message, then an interrupt is written to page zero and input state machine transitions to state 86. If no unread message exists, then the interrupt information is updated by writing to page 0 and a pull interrupt request signal is generated in state 106.

Figure 8A:
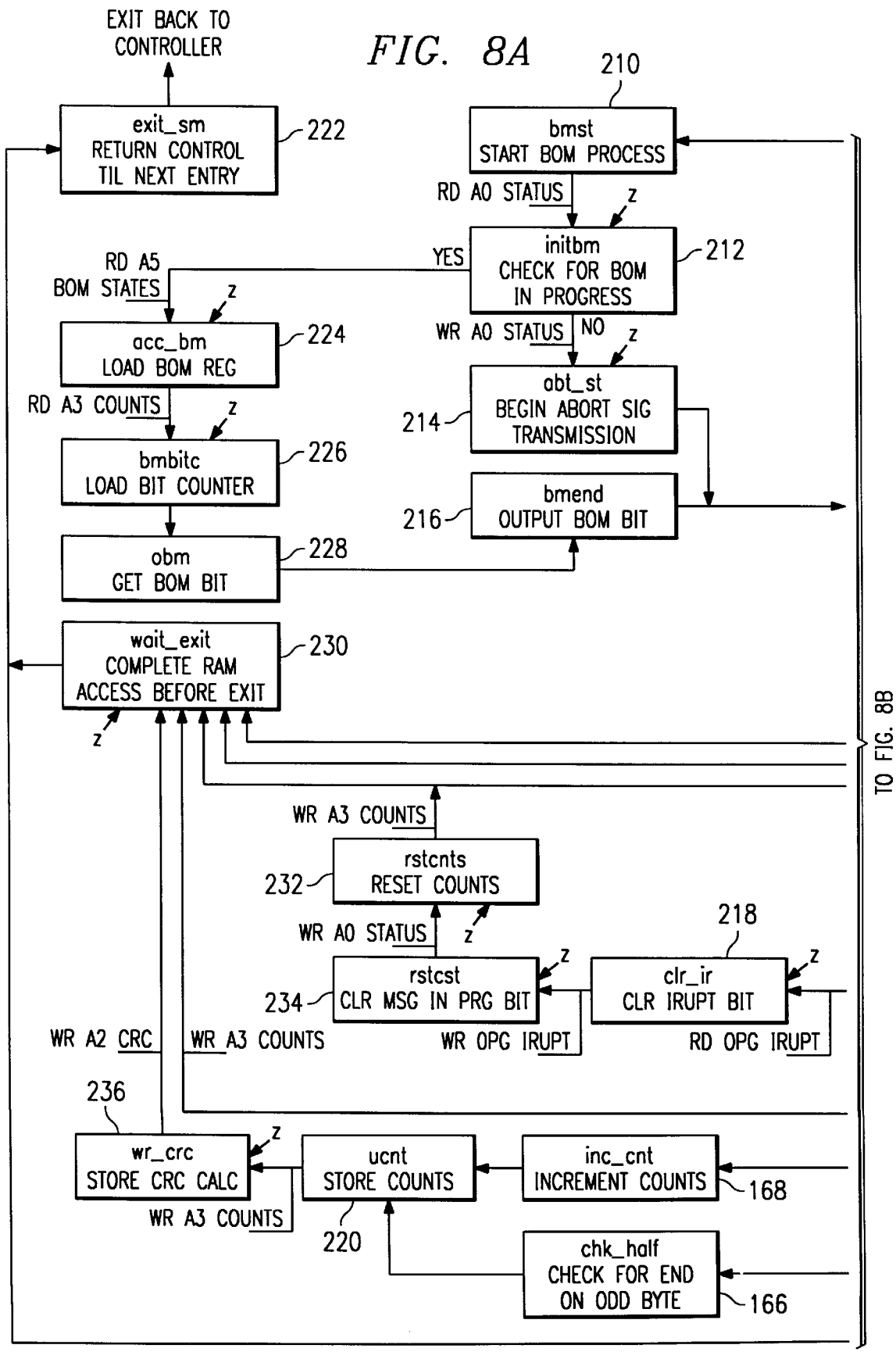
FIGS. 8A–8C illustrates a state diagram for the exemplary output interface state machine illustrated in FIG. 4.
Figure 8B:
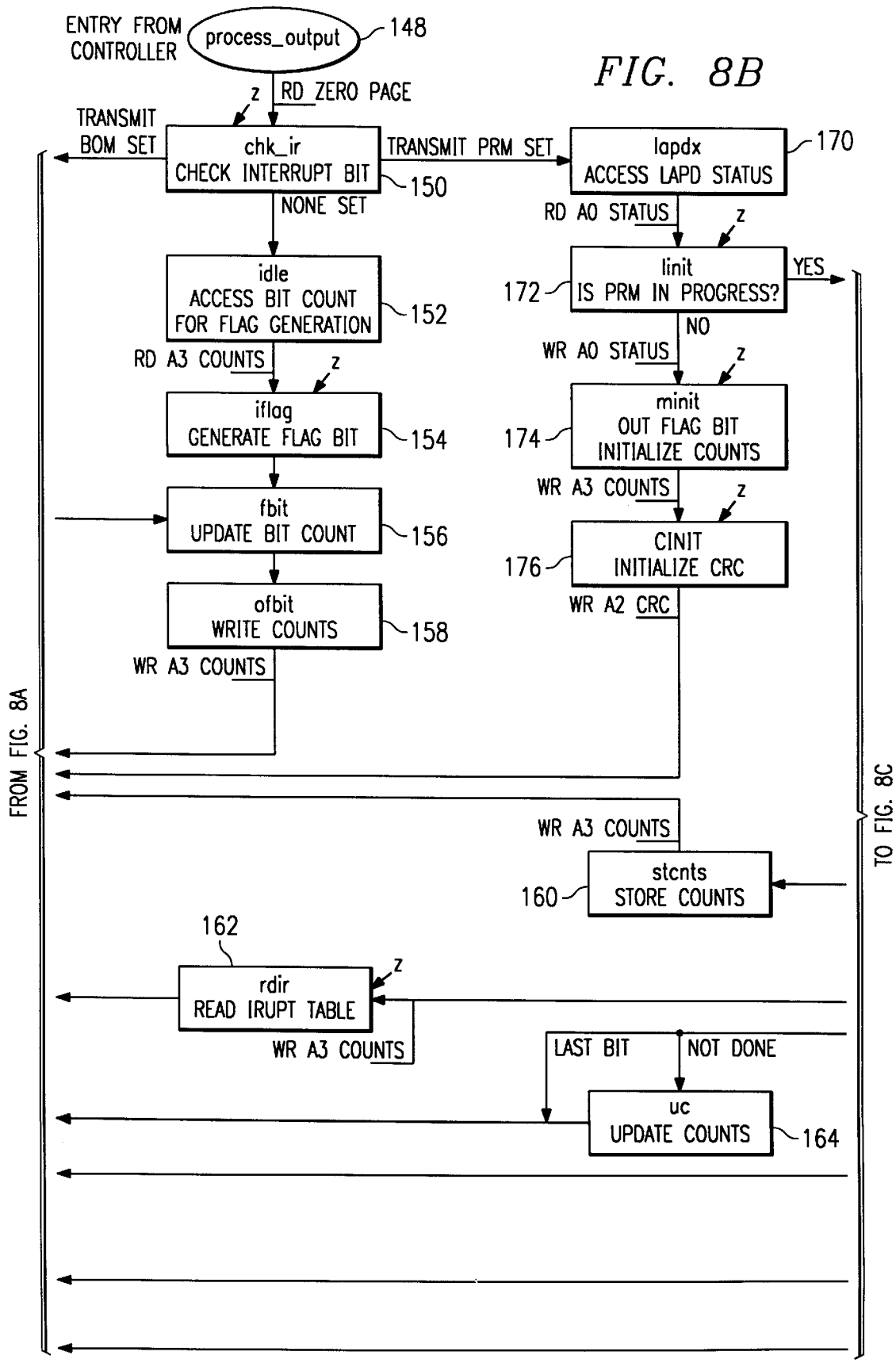
Figure 8C:
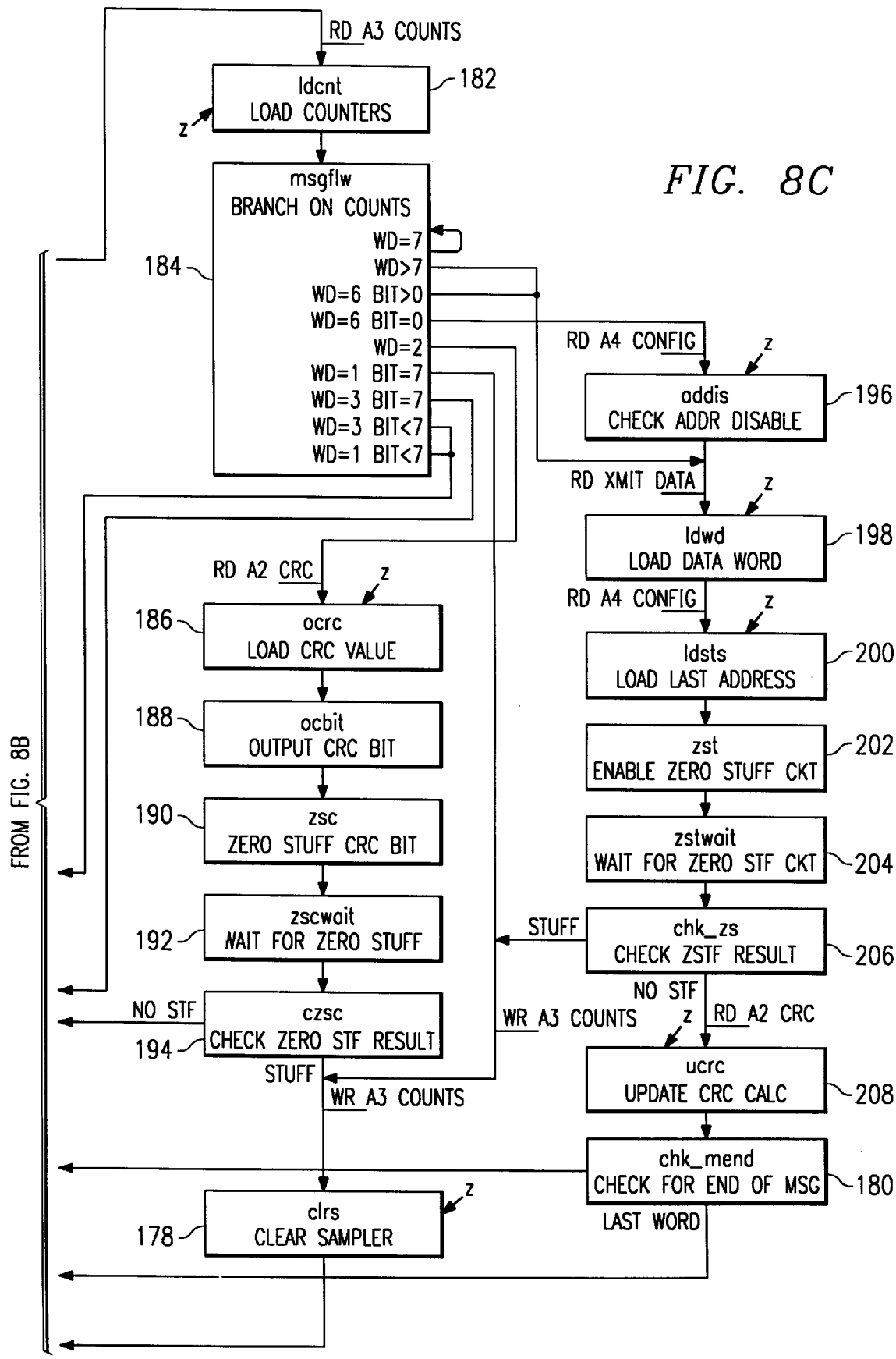

FIGS. 8A–8C illustrate an exemplary state diagram that may be used for output state machine 62. Again, FIGS. 8A–8C illustrate only one example of a state diagram that could be used to control output state machine 62. Output state machine 62 could function differently without departing from the scope of the invention.

Output state machine 62 begins in state 148 when it receives a process output signal from controller state machine 58. In state 148, the zero page is read from dual port RAM 28. In state 150, the interrupt bit for the channel indicated by active channel counter 40 is checked. If the transmit BOM interrupt bit is set, then output state machine 62 transitions to state 210. If the transmit PRM interrupt bit is set then output state machine 62 transitions to state 170. If no interrupt bit is set, then output state machine 62 transitions to state 152. In state 152 the bit counter is accessed for flag generation by reading the contents of address a3. Then, in state 154 a flag bit is generated. The bit count is updated in state 156 and the counters are then written back to address a 3 in state 158. Following state 158, output state machine 162 transitions to state 230 where output state machine 60 waits for a RAM access to complete before transitioning to state 222 for exit. In state 222, output state machine 62 returns control to controller state machine 58 by generating an output done signal.

Returning to state 210, if the BOM interrupt bit was set in state 150, then the BOM process begins in state 210 with the reading of the facility datalink status information from address a0. Then, in state 212, the status information is checked to see if a BOM message is in progress. If so, then the BOM state information is read from address a5 and output state machine 62 transitions to state 224. If not, then the status information is written to address a0 and output state machine 62 transitions to state 214.

If a BOM message was in progress, then the BOM register is loaded in state 224 by reading the counter information from address a3. Then, in state 226 the bit counter is loaded. In state 228 the BOM bit is then retrieved and outputted in state 216. Following state 216, output state machine 62 transitions to state 156.

Returning to state 212, if no BOM message was in progress, then the status information was written to address a0 in order to set the BOM in progress flag and in state 214 the transmission of an abort signal is begun. From state 214, output state machine 62 transitions to state 156 where the bit count is updated.

Returning to state 150, if the transmit PRM message interrupt bit was set then output state machine 62 transitions to state 170. In state 170 the LAPD status information is accessed by reading address a0. Next, in state 172 it is determined whether a PRM message is in progress. If not, then the status information is written to address a0 and output state machine 62 transitions to state 174. If a PRM message is in progress, then the counters are read from address a3 and loaded in state 182.

Returning to state 172 following the writing of the status information, if a PRM message was not in progress the flag bit is output and the counters are initialized by writing this information to address a3 in state 174. Then, in state 176 the CRC value is initialized by writing the data to address a2. Output state machine 62 then transitions to state 230 to complete the RAM access before exiting.

Returning to state 182, after the counters are loaded, output state machine 62 transitions to state 184 where output state machine 62 takes different branch actions based upon the status of the word and bit counters. If the word counter is equal to 7, then output state machine 62 remains in state 184. If the word counter is greater than 7 or the word counter equals 6 and the bit counter is greater than 0, then output state machine 62 branches to state 198. If the word count is equal to 6 and the bit count is equal to 0, then the output state machine 62 transitions to state 196. If the word counter is equal to 2, then the output state machine 62 transitions to state 186 and reads the CRC value from address a2. If the word counter is equal to 1 and the bit counter is equal to 7, then the output state machine 62 transitions to state 178 and writes the value of the counters to address a3. If the word counter is equal to 3 and the bit counter is equal to 7, then the output state machine 62 transitions to state 162 and writes the value of the counters to address a3. If the word count counter equals 3 and the bit counter is less than 7, or the word counter equals 1 and the bit counter is less than 7, then the output state machine 62 transitions to state 160 where the counter information is stored in address a3 before transitioning to state 230.

Returning to state 186 the CRC value is loaded into CRC calculator 38. Then, in state 188 a CRC bit is output. Following this output, the CRC bit is zero stuffed in state 190. In state 192 output state machine 62 waits for the zero stuff to complete. In state 194, the result of the zero stuffing operation is checked. If no zero stuff was required and the word has completed, then the counter information is stored in address a3 and the output state machine 62 transitions to state 230. If, however, no stuffing was required and the word is not done, then the counters are updated and then written to address a3 in state 164. Following state 164, output state machine transitions to state 230.

Returning to state 194, if a zero stuffing operation was required, then the contents of the counters are written to address a3 and output state machine 62 transitions to state 178. In state 178, the sampler is cleared and output state machine 62 returns to state 222.

Returning to state 196, in that state it is determined whether the address disable signal has been set. If the address register is disabled, then the RAM address is set to the first byte of data. If the address register is not disabled, then the RAM address is set to point to A6, the SAPI/TEI register. Then, the data to be transmitted is read and output state machine 62 transitions to state 198. In state 198 the data word is loaded into FDL output register 50. The configuration data is then read from address a4. In state 200, the last address information is loaded followed by the enabling of the zero stuff stuffer 54 in state 202. In state 204, output state machine 62 waits for zero stuffer 54 to complete its operation. Then, in state 206 it is determined whether a zero stuff was required. If a zero stuff was required, then the counters are written to address a3 and output state machine 62 transitions to state 178. If no zero stuff was required, then the CRC information is read from address a2 and the CRC calculator is updated in state 208. Next, in state 180 it is determined whether the end of message has been reached. If this is the last word in the message, then output state machine 62 transitions to state 166. Otherwise, output state machine transitions to state 168

If the end of message has been reached, then in state 166 the end of message on an odd byte condition is checked for. Output state machine 62 then transitions to state 220. If the end of the message was not found in state 180, then the counters are incremented in state 168. Next, in state 220 the counters are stored by writing them to address a3. In state 236, the contents of CRC calculator 38 are then stored in address a2 followed by a transition to state 230.

Returning to state 162, the interrupt table is read by reading the contents of page zero. Then, in state 218 the appropriate interrupt bit is cleared and the interrupt information is then updated by writing it to page 0. In state 234, the message in progress bit is cleared and the status information updated by writing it to address a0. Then, in state 232, the counters are reset and written to address a3 followed by a transition to state 230.

FIG. 9 shows a memory map illustrating the organization of data in dual port RAM 28 of FIG. 2. Any type of memory organization could be used without departing from the scope of the invention.

In this embodiment of the invention, dual port RAM 28 is partitioned into pages. The zero page is reserved for individual channel message received indicators and BOM message received indicators to be used in conjunction with an interrupt signal to inform microprocessor 26 which channels cause the interrupt. The invention employs a novel interrupt structure to inform the processor of the type of message to be processed. The zero page is also used for outbound facility datalink messages to allow the microprocessor 26 to direct multichannel facility datalink processor 24 to send a message.

Pages 1–28 are each associated with an individual inbound channel. In this embodiment, each of pages 1–28 comprises 128 address locations—eight address locations of 16-bit words containing state information for the input facility datalink channels as well as 120 address locations of 16-bit words comprising storage for HDLC messages. Similarly, pages 33–60 are each associated with an individual output facility datalink facility. Each channel page is divided into transmit state storage and transmit HDLC data storage. Like the input (or receive state) storage, the transmit state storage comprises eight address locations, each addressing a 16 bit word for each output channel. Each output channel also has access to 120 address locations addressing 16 bit words to store data for HDLC messages to be transmitted.

Active channel counter 40 is used to identify the page in memory from which information is retrieved and stored from dual port RAM 28. That is, active channel counter 40 identifies the page of memory on which state information and data for the current channel being processed can be found. The memory map chosen for this embodiment allows active channel counter 40 to be a 5-bit counter that cycles from 1 to 28, plus a sixth bit that indicates whether an input or output channel is being processed. Because the combination of the sixth bit being set (indicating output channels are being processed) and the counter being set to one for the first output channel amounts to an integer value of 33, the transmit information begins at page 33 of the memory.

Addresses 00–03 contain a pair of bits for each input facility datalink channel. This pair of bits is used to allow microprocessor 26 to efficiently and easily determine which facility datalink channel needs to be processed. Whenever an HDLC formatted message has been fully received on one of the channels, the appropriate word on page zero is read, modified, and written with the P-bit set for that channel. When the P-bit is set, the microprocessor 26 knows that an HDLC formatted message is available in dual port RAM 28 for that input channel. Similarly, whenever 4 out of 5 consecutive equivalent BOM messages are received, the appropriate word in page 0 is read, modified, and written to set the B-bit for that channel. The B-bit being set indicates that a BOM message is available for processing by microprocessor 26.

Thus, multichannel facility datalink processor 24 generates an interrupt signal to microprocessor 26 only when one of the B-bits or P-bits has been set. Microprocessor 26 can continue performing higher priority operations and can access page zero of dual port RAM 28 to determine which channel generated the interrupts. If multiple B-bits or P-bits are set when microprocessor 26 goes to service the interrupt, then it will process each channel for which the B-bit or P-bit is set for that channel. For channels that have their B-bit or P-bit set, multichannel facility datalink processor 24 will disable processing of further HDLC or BOM messages until microprocessor 26 has read the data from dual port RAM 28. In this embodiment, microprocessor 26 should also clear the B-bit or P-bit to signal multichannel facility datalink processor 24 that the appropriate message has been read and that new messages may now be processed.

The invention thus allows efficient processing of incoming BOM or HDLC messages. An interrupt to microprocessor 26 is generated only when one of the input facility datalink channels has a message that needs to be processed. The appropriate interrupt flag is then set in dual port RAM 28. When processor 26 goes to process an interrupt, it simply retrieves all of the interrupt flags from page zero and determines which interrupt flags are set. Microprocessor 26 then processes the messages associated with the interrupt flags that are set. Upon retrieval of the message, the corresponding interrupt flag is reset by the processor. Thus, the invention avoids the need of having to generate vectors for each interrupt and uses a small amount of memory in dual port RAM 28 for interrupt overhead.

Addresses 04–07 of page zero of dual port RAM 28 contain a pair of bits for each output facility datalink channel. When an HDLC message or BOM message has been written to the transmit message storage for a particular channel by microprocessor 26, it performs a read-modify-write operation on the appropriate transmit ready word to set the bit corresponding to the channel and message type. When such a bit is set, multichannel facility datalink processor 24 will output the facility datalink message that is set to be output. When transmission of that message is complete, then multichannel facility datalink processor 24 performs a read-modify-write operation on the appropriate interrupt word to clear the bit. In the case of a BOM message, the message is continuously transmitted until the bit is cleared by microprocessor 26. By using an atomic operation to change the state of the appropriate transmit ready bit in dual port RAM 28, the invention avoids malfunctions that could be created through the inconsistency of transmit ready bits attempting to be both read and written simultaneously.

FIG. 10 shows the memory map illustrating the organization of the receive state information for each of the 28 pages of receive state storage in the memory map of FIG. 9. Again, the data may be organized differently without departing from the scope of the invention. Similarly, more or less data could be maintained without departing from the scope of the invention. As noted above, each page of receive state storage is accessed based upon active channel counter 40. Active channel counter 40 is used to point to the page in memory where the receive state for the corresponding channel is stored. As illustrated in FIG. 10, the receive state information comprises 8 address locations of 16 bits each.

Address location 0 comprises 2 bits used for channel configuration, a bit for channel disable, and a bit for address disable. The channel configuration information is used to configure message acceptance options. For normal operations, this register is cleared. Bit 15 of address 0 is set to 1 when a channel is disabled and no messages will be processed for that channel. When the bit is set to 0, then the channel is enabled. Bit 14 comprises an address disable signal. When that bit is set to 1, SAPI and TEI address checking is disabled.

Address location 1 of the receive state information comprises facility datalink processor state information. Bits 0–6 comprise a word counter used for tracking addresses and locating words within the received message. Bits 7–10 comprise a bit counter used to store the state of the internal facility datalink processor bit counter. Bit 15 comprises a BOM-in-progress flag which is set by the multichannel facility datalink processor 24 when an abort signal is received.

Address location 2 comprises state information for input monitor 34. Bits 6–8 are used to store the ones counter for the input monitor 34 which is used to detect flags and abort signals. Bits 9–15 store the 7 bits of the internal input monitor register. The oldest bit (0) is not stored. This value is read back into the facility datalink processor shifted by 1 so that bit 9 becomes bit 0.

Address location 3 of the receive state storage is used upon receipt of a complete valid message to pass message length information to the firmware of microprocessor 26. Bits 0–6 contain the last address copied from the state memory upon completion and validation of an incoming message. All PRM messages begin at the appropriate channel page+08 and end at channel page+last address+1. Bit 10 comprises a half word flag. When bit 10 is set, then the final message word contains only 1 valid byte in the most significant half of the final message memory location.

Address location 4 of the receive state storage is used to pass received BOM messages to microprocessor 26. It also contains internal facility datalink processor BOM state information. Bits 0–7 contain the received BOM message. This message is only valid while the associated message received bit is set on page zero following an interrupt. Bits 8–9 comprise an internal BOM counter used during BOM acquisition. Bit 10 comprises a BOM valid signal which is internal state information used during BOM acquisition. Similarly, bit 11 also comprises a BOM valid bit used during BOM acquisition.

Address location 5 of the receive state storage is used to store the expected SAPI and TEI addresses. When enabled, the received addresses are compared to these messages for message validation. Bits 0–7 of this location contain the 8-bit expected TEI including the EA bits. Bits 8–15 comprise the expected SAPI address including the CR and EA bits.

Address location 6 of the receive state storage comprises the 16-bit CRC calculation value which is used by CRC calculator 38 for CRC calculation and storage.

Address location 7 of the receive state storage comprises the contents of input shifter 36. These contents are used by multichannel facility datalink processor 24 for data storage of an incoming facility datalink word.

FIG. 11 shows a memory map illustrating the organization of transmit state information for each page of transmit state storage in the memory map illustrated in FIG. 9. Each of the 28 channels includes a page of transmit state storage such as that illustrated in FIG. 11. Again, FIG. 11 provides only one example of the organization of transmit state storage and other organization could be used without departing from the scope of the invention. In addition, more or less state information could be maintained without departing from the scope of the invention.

Address location 0 for the transmit state storage is used for the internal facility datalink processor's internal state. Bit 14 comprises a message-in-progress flag which is set to 1 while an incoming HDLC or LAPD message is being monitored. Similarly, bit 15 is a BOM-in-progress flag that is set to 1 while an incoming abort sequence is being monitored.

In this embodiment, address location 1 is not used in the transmit state storage. Address location 2 comprises the CRC calculation information. The 16 bits are used to store the contents of CRC calculator 38 for the particular output channel.

Address location 3 of the transmit state storage is used to store several counters for the internal state of output state machine 62. Bits 0–6 contain a word counter which comprises the RAM address of the current word. Bits 9–11 comprise a stuff counter which is used to determine when a zero stuff should be performed on data to be transmitted. Bits 12–15 contain a bit counter which is used to locate a position within a data word.

Address location 4 of the transmit state storage comprises information used for the output configuration register. Bits 0–6 are set by the microprocessor to the address of the final word containing the message bits to be transmitted. Bit 7 is used as a half word flag and is set to 1 when the final word to be transmitted is 2 bytes and is set to 0 when only the most significant byte of the final word is to be transmitted. Bit 15 comprises an address disable flag which is set to 1 when SAPI and TEI are not to be transmitted.

Address location 5 of the transmit storage comprises the contents of the BOM register. Bits 0–7 contain the BOM message (including leading and trailing 0s) to be transmitted.

Address location 7 is not used in this embodiment. Address location 6 of the transmit storage contains the SAPI and TEI addresses to be transmitted when such transmission is enabled. Bits 0–7 comprise the TEI byte and the microprocessor writes this location with the TEI (including the EA bit) to be transmitted. Similarly, bits 8–13 contain the SAPI byte. The microprocessor writes this location with the SAPI (including the CR and EA bits) to be transmitted.

Although the present invention has been described in detail, it should be understood that various changes, substitutions and alterations can be made hereto with departing from the spirit and scope of the invention as defined by the appended claims.

What is claimed is:

1. A shared signal processor, comprising:

input circuitry operable to receive a plurality of input signals;

output circuitry operable to transmit a plurality of output signals;

storage circuitry operable to store state information and signal data for each of the plurality of input signals and each of the plurality of output signals;

a state machine coupled to the input circuitry, output circuitry, and storage circuitry and operable to poll each input signal and output signal to identify a first signal requiring processing, the state machine further operable to load the state information and signal data associated with the first signal and process the first signal, the state machine operable to perform a zero destuffing function or a zero stuffing function in response to the first signal being an input signal or an output signal, respectively.

2. The shared signal processor of claim 1, wherein the state machine is further operable to revise the state information and signal data associated with the first signal in connection with the processing of the first signal.

3. The shared signal processor of claim 2, wherein the state machine is further operable to store the revised state information and signal data in the storage circuitry.

4. The shared signal processor of claim 1, wherein the state machine further comprises a hierarchical state machine.

5. The shared signal processor of claim 4, wherein the state machine further comprises:

an input state machine operable to process ones of the plurality of input signals;

an output state machine operable to process ones of the plurality of output signals;

a control state machine operable to activate and deactivate the input state machine and the output state machine.

6. The shared signal processor of claim 5, further comprising:

a storage circuitry interface state machine operable to retrieve the state information and signal data from the storage circuitry and further operable to cause the storage of the state information and signal data in the storage circuitry.

7. The shared signal processor of claim 5, wherein the control state machine is further operable to activate the input state machine when one of the plurality of input signals has a bit ready for processing, wait for the bit that is ready for processing to be processed, and resume operation in response to a signal from the input state machine indicating that the bit has been processed.

8. The shared signal processor of claim 5, wherein the control state machine is further operable to activate the output state machine when one of the plurality of output signals requires processing of another bit, wait for the next bit of the output signal to be processed, and resume operation in response to a signal from the output state machine indicating that the bit has been processed.

9. The shared signal processor of claim 1, wherein the state machine further comprises a cyclic channel counter to identify the current input signal or output signal being polled.

10. The shared signal processor of claim 9, wherein the value of the cyclic channel counter further comprises a page number that indicates the page in the storage circuitry where the state information and signal data associated with the current input signal or output signal being polled.

11. The shared signal processor of claim 1, wherein the state machine and storage circuitry reside on different integrated circuits.

12. The shared signal processor of claim 1, further comprising:

an input state machine operable to process ones of the plurality of input signals; and an output state machine operable to process ones of the plurality of output signals.

13. A method for sharing a state machine, comprising:

receiving a plurality of input signals;

generating a plurality of output signals;

polling each input signal and each output signal to determine whether any input signal or output signal is ready for processing;

loading a state machine with first state data and first signal data associated with a first input signal comprising one of the plurality of input signals in response to an indication that the first input signal has a bit ready for processing;

processing the bit of the first input signal using the state machine;

causing a revision in the first state data and first signal data in response to the bit of the first input signal;

storing the revised first state data and revised first signal data in storage circuitry after the bit of the first input signal has been processed;

performing a zero destuffing function on the first input signal;

loading the state machine with second state data and second signal data associated with a first output signal comprising one of the plurality of output signals in response to an indication that the first output signal requires another bit for transmission;

processing the bit of the first output signal using the state machine;

causing a revision in the second state data and second signal data in response to the bit of the first output signal;

storing the revised second state data and revised second signal data in storage circuitry after the bit of the first output signal has been processed; and performing a zero stuffing function on the first output signal.

14. The method of claim 13, wherein the state machine comprises a hierarchical state machine.

15. The method of claim 13, wherein the state machine comprises:

an input state machine operable to process ones of the plurality of input signals;

an output state machine operable to process ones of the plurality of output signals;

a control state machine operable to activate and deactivate the input state machine and the output state machine.

16. The method of claim 15, wherein the control state machine is further operable to activate the input state machine when one of the plurality of input signals has a bit ready for processing, wait for the bit that is ready for processing to be processed, and resume operation in response to a signal from the input state machine indicating that the bit has been processed.

17. The method of claim 13, wherein the state machine further comprises a cyclic channel counter to identify the current input signal or output signal being polled.

18. The method of claim 17, wherein the value of the cyclic channel counter further comprises a page number that indicates the page in the storage circuitry where the state data and signal data associated with the current input signal or output signal being polled.

* * * * *